C. F. Hartmann,
Wine Press.
No. 100,142. Patented Feb. 22, 1870.
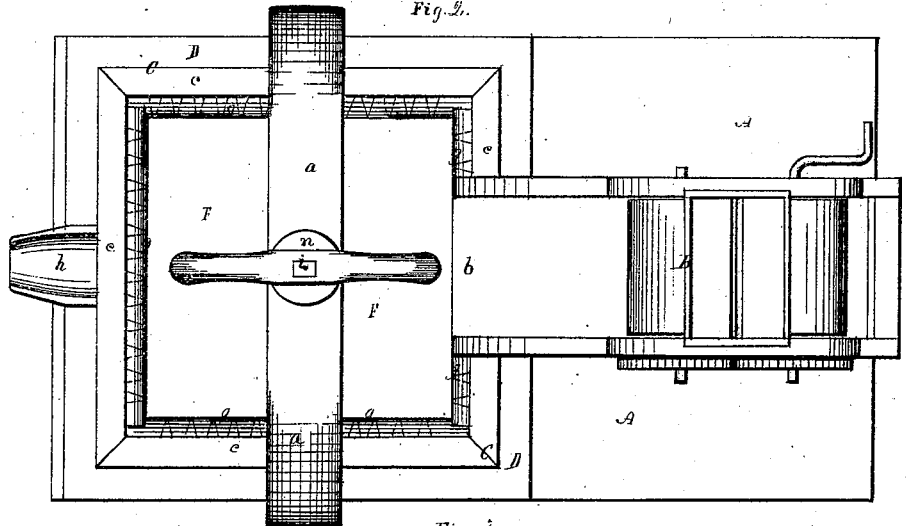
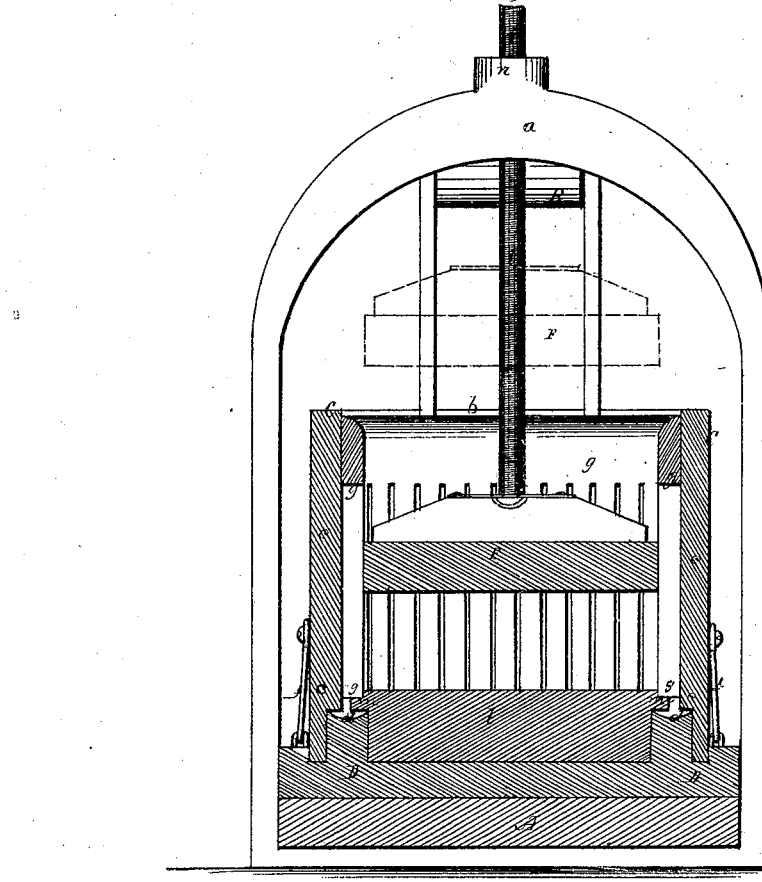

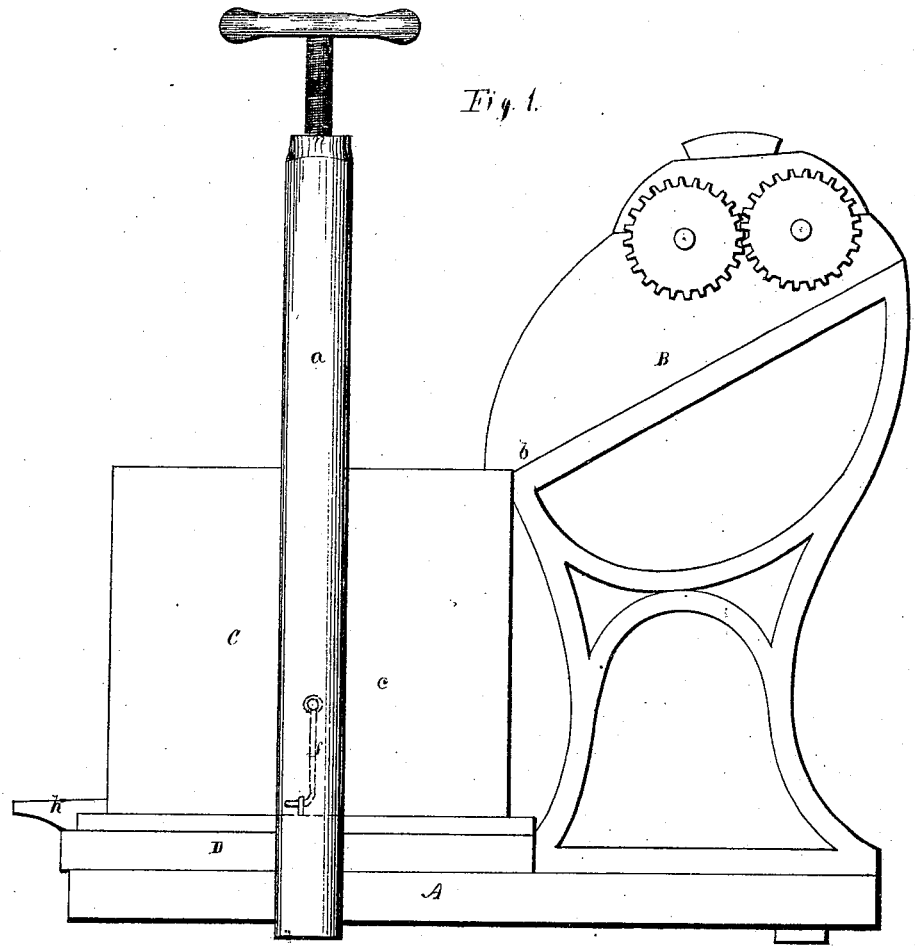

United States Patent Office.

C. F. HARTMANN, OF NAZARETH, PENNSYLVANIA

Letters Patent No. 100,142, dated February 22, 1870.

IMPROVEMENT IN WINE-PRESSES.

The Schedule referred to in these Letters Patent and making part of the same

*To all whom it may concern:*

Be it known that I, C. F. HARTMANN, of Nazareth, in the county of Northampton, and State of Pennsylvania, have invented an Improved Wine-Press; and I do hereby declare that the following is a full and exact description thereof, reference being had to the accompanying drawings making part of this specification.

Figure 1 is a side elevation of the press;

Figure 2, a top view of the same;

Figure 3, a transverse vertical section thereof, in a plane indicated by the line $x\,x$, figs. 1 and 2.

Like letters designate corresponding parts in all of the figures.

The object of my invention is to produce an improved press, particularly for making grape wine, and also well adapted for making wines from other fruits, including cider, whereby not only the general advantages of convenience and expedition are secured in a superior manner, but especially the juice is expressed very quickly after the crushing of the fruit, and with the least possible exposure to the air, so that by restraining the oxygenation of the juice in the pulp, a superior quality of wine is obtained and less sugar is required. Other advantages of simplicity of construction, being easily taken apart to clean, and dispensing with metal as a material, if desired, are kept in view.

In the accompanying drawings—

Let A represent a suitable base of any desired dimensions;

B, the crushing apparatus, situated upon one end of the base; and

C, the press-box, situated on the other end of the base and close to the crushing apparatus.

The crushing apparatus B may be constructed as represented in the drawings; but, as I claim no novelty therein, particular description thereof is unnecessary. Yet, in order to conduct the juice and pulp as quickly as possible to the press without exposure to the air and in the most convenient way, a sufficiently inclined spout, $b$, conveys the same at once from the crusher into the press-box at one side thereof.

The press-box C has its sides $c\,c$ all joined permanently together, which rest upon a bottom, D, projecting from beneath them, and are fastened thereon by hooks and eyes $f\,f$, or equivalent means, so that they can be readily separated therefrom to get free access to all the interior of the box.

The box, thus joined together, slides freely upon or off the base A, and, when in position thereon, it receives the crusher-spout $b$ in a notch of or over one side.

Inside of the press-box sides $c\,c$ are removable grate-boards or linings $g\,g\,g\,g$, formed with vertical slats or bars, with slots or spaces between them, wider at the outer surface of the grates, next to the interior surfaces of the sides of the press-box, than at their inner surface, so that the expressed juice can have a free passage downward while the pulp is retained inside. The grates are removable, so that they may be easily cleaned as well as the box around them.

Though such grates have been before used, I employ in connection with them an improved construction of the press bottom D, in which I form grooves or channels $d\,d$ near its edges in its upper surface, so situated as to be directly under the grates and under the inner edges of the sides $c\,c$ of the box, but neither communicating with the outside nor with the inside of the grate-lined box, whereby the juice is kept from contact with the air, and the pulp of the fruit is excluded from obstructing the passage.

The bottom D is inclined toward the adjacent end of the base A, where it has a discharging-spout, $h$, receiving the juices from the grooves or channels $d\,d$.

The interior block or bed $l$ of the bottom D is removable from the base and grooved portion, sinking into a recess or cavity inside of the grooves or channels $d\,d$, and its edges project over the grooves somewhat, having rabbets $m\,m$ to receive the lower edges of the grates and sustain them above the said grooves or channels.

The follower F is attached to the lower end of a screw, $i$, which turns in a nut, $n$, of a standard or arch bearing, $a$, extending upward from the sides of the base A, substantially as represented.

This arch is of sufficient height and the screw $i$ is of sufficient length to enable the follower to be raised entirely above the press-box for the removal of the press-box, and above the spout $b$ of the crushing apparatus, so that when not pressing it can quickly be elevated without removing out of the way of the direct introduction of the crushed or ground fruit from the said crushing apparatus, and as soon as the press-box is full the follower is immediately brought down into action for expressing the juice therefrom. The raised follower is represented by dotted lines in fig. 3.

What I claim as my invention, and desire to secure by Letters Patent, is—

The construction and arrangement of the bottom D, with its grooves or channels $d\,d$, situated directly under the grates $g\,g$, and removable block or bed $l$, projecting partially over said grooves and sustaining the grates in combination therewith, substantially as herein set forth.

C. F. HARTMANN.

Witnesses:
CHRISTN. D. BUSSE,
BENJAMIN T. RAUCH.